Feb. 23, 1971  S. W. NILSSON  3,565,471
LOCKING MEANS

Filed May 15, 1969  2 Sheets-Sheet 1

INVENTOR:
SVEN WALTER NILSSON
BY Howson & Howson
ATTYS.

Feb. 23, 1971  S. W. NILSSON  3,565,471
LOCKING MEANS
Filed May 15, 1969  2 Sheets-Sheet 2

INVENTOR:
SVEN WALTER NILSSON
BY Howson & Howson
ATTYS.

3,565,471
LOCKING MEANS
Sven Walter Nilsson, Savedalen, Sweden, assignor to Aktiebolaget Svenska Kullagerfabriken, Goteborg, Sweden, a corporation of Sweden
Filed May 15, 1969, Ser. No. 824,815
Claims priority, application Sweden, May 20, 1968, 6,764/68
Int. Cl. F16d 1/06
U.S. Cl. 287—52.06                                 5 Claims

ABSTRACT OF THE DISCLOSURE

To interconnect a bar and a tubular member enclosing the same a mechanism is used, which comprises an internal expander element having mating conical surfaces and being worked by a nut rotatable on the threaded end of the bar. In order to prevent deformation of the tubular member, and also for increasing the locking function a washer is located between the bar and the tubular member. This washer has an axially directed recess, which closely fits the cylindrical end portion of the tubular member, and within this enclosed portion the expander element works.

BACKGROUND OF THE INVENTION

The present invention refers to means for rigidly interconnecting a bar and a tubular member enclosing the same by the aid of a nut or other lock member mounted on the threaded end of the bar. A similar locking arrangement will be obtained if the tubular member and the bar are fitted into an adjoining component having a threaded part adapted to receive the bar. The aim of the invention is to bring about a locking means which guarantees an exact centering of the tubular member in relation to the bar and a rigid connection of the tubular member without deforming the end thereof. Said means may furthermore be designed in such a manner that it will form a resilient stop for a body displaceable along the tubular member.

SUMMARY OF THE INVENTION

The invention is characterized by a washer body mounted between the locking member and the tubular member and being provided with an axially directed recess in the surface presented towards the tubular member and designed exactly to enclose the end portion thereof, the inside of said end portion presented towards the bar being bevelled to form a conical surface adapted to cooperate with the expander member, which is located between said bevelled surface and the bar, and is designed as an annulus with triangular cross section, essentially filling the available space between the bevelled surface and the bar.

DESCRIPTION OF THE PREFERRED EMBODIMENTS

Figure 1:
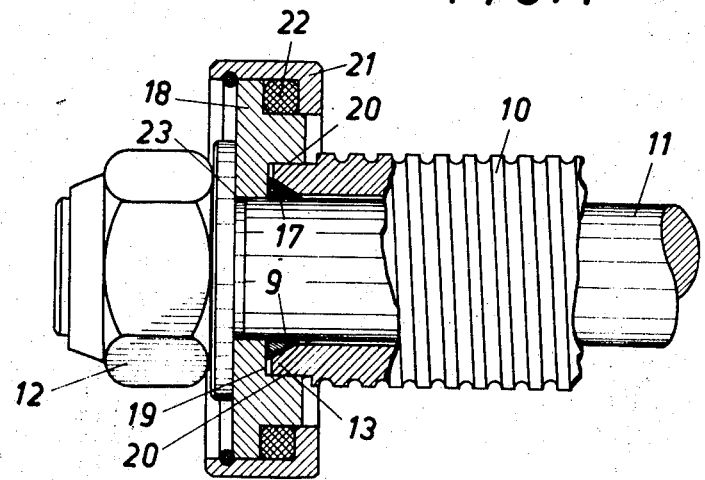
FIG. 1 shows an embodiment of the invention as utilized in connection with an outwardly threaded tubular member forming part of ball nut mechanism.

The embodiment shown in FIG. 1 consists of a tubular member 10, the outside of which is threaded, and which is mounted upon and locked in relation to a bar 11. On the threaded end of the bar a nut 12 is mounted. The end portion 13 of the tubular member 10 is cylindrical on its outside, and is internally bevelled, forming a conical surface 9 extending towards the edge of the tubular member. An expander ring 17 cooperates with this bevelled surface, the ring having triangular cross, with one surface providing the same conical surface as the surface 9.

Between the nut 12 and the end portion of the tubular member 19 a washer 18 is mounted, which is provided with a recess having a bottom 19 adapted to abut against the expander ring 17. This washer may form part of a bracket by means of which the tubular member and the bar are carried by the main body of another component, for instance a machining tool. An opening 23 in washer 18 is machined with such a tolerance in relation to the end portion of bar 11, which is fitted into the washer, that a thorough centering between washer and bar is brought about. The recess has a side surface 20, which is exactly concentric with the opening 23 and with a suitable tolerance encloses the cylindric end portion 13 of the tubular member 20. When nut 12 is turned on the threads it forces the washer 18 against the tubular member and hereby an axial force is obtained between the expander ring 17 and the surface 9, whereby the tubular member and the bar will be securely locked together, simultaneously an exact centering of the tubular member in relation to the bar 11 is brought about. As the cylindrical surface 20 exactly encloses the end of the tubular member 10 a deformation of the member is prevented, beside which the locking forces are increased.

In the present embodiment the intention is that the tubular member 10, which is provided with external threads, shall form the counterpart of a nut, which on this occasion is a ball nut, displaceable along the tubular member. In order to limit the axial movement of this nut a flanged ring 21 is mounted on the washer 18 and cooperates with the main part thereof by way of an annular elastic body 22. The ring 21 may thus be displaced axially due to the action of the nut without noticeably influencing the washer 18, which would endanger the locking function.

Figure 2:
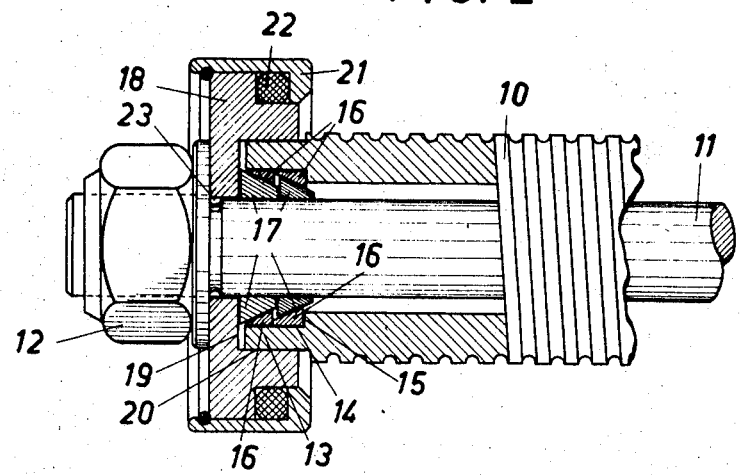
FIG. 2 shows a modified embodiment having a more complex expander element construction.

The embodiment shown in FIG. 2 mainly corresponds to that according to FIG. 1, with the exception that the end portion 13 of the tubular member is provided with a cylindrical recess 14, which is terminated by a shoulder 15. In this recess one or more, in the present embodiment two, expander elements each comprising a pair of expander rings 16, 17 of a type known per se are mounted. The cross sections of the two rings in a pair are of essentially the same straight angle, triagular shape but the triangles are mounted in mirror image position. One leg of the triangle, which is perpendicular to the shaft has essentially the same length as the radial clearance between the tubular member and the shaft within the recess, while the other leg is noticeably longer than the first mentioned one. In this manner an expander element is formed, the axial extension of which exceeds that of the recess and principally fills the same.

It is of course necessary that the combined length of two or more expander ring elements exceeds the axial extension of the recess 14.

Figure 3:
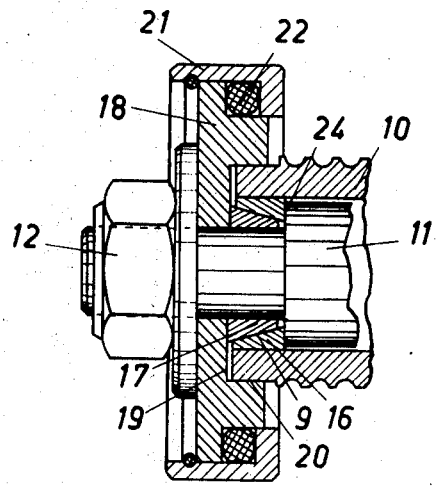
FIG. 3 shows a further modified embodiment whereat the recess for the expander element is located at the bar.

The embodiment shown in FIG. 3 essentially corresponds to that according to FIG. 1. Here, however, the conical surface 9 is located in a separate ring 16 and the internal surface of the tubular member is cylindrical. The end portion of the bar is instead recessed in such a manner that a shoulder 24 is formed against which the expander ring 16 rests.

Figure 4:
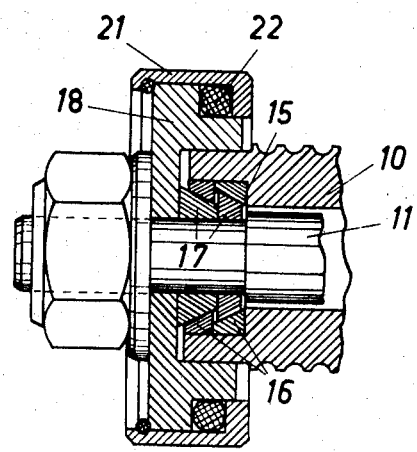
FIG. 4 shows an embodiment, where the recess is located partly in the tubular member and partly at the bar.

In the embodiment according to FIG. 4 two expander elements, each composed of a pair of rings 16, 17, are used. The main difference is that the recess for these elements is formed partly in the tubular member and partly at the bar. The innermost of the outer rings 16 is here supported by the bottom 15 of the recess in the tubular member.

What I claim is:

1. Means for interconnecting a bar and a concentric tubular member enclosing the same:
   a threaded end portion on the bar and an adjustable locking member fitted on said threaded portion;
   an outwardly cylindrical end portion on the tubular member and a bevelled surface radially inward of said cylindrical end portion;
   an expander ring element having an outwardly directed, conical surface mating with the bevelled surface on the tubular member and fitted between the bar and the tubular member;
   a washer body mounted on the bar between the locking member and the end of the tubular member;
   an axially directed counterbore providing a recess in the surface of the washer facing the tubular member and having an annular wall exactly enclosing the cylindrical end portion of the tubular member, the bottom of said recess engaging the expander ring to force the same against the bevelled surface upon turning of the locking member.

2. The means claimed in claim 1 in which the bevelled surface at the tubular member is formed as a separate ring mounted in a recess formed between the tubular member and the bar.

3. The means claimed in claim 2 in which the expander element and the separate ring are both formed with straight angle, triangular cross section and are mounted in the recess, one leg of each triangle being shorter than the radial clearance between the tubular member and the bar within said recess, the other leg being noticeably longer, the two cooperating rings together having an axial extension exceeding that of the recess in the tubular member.

4. The means claimed in claim 3 in which two or more pairs of expander element and cooperating separate ring are located in the same recess, the combined length of said pairs exceeding the axial length of the recess.

5. The means as claimed in claim 1 in which the washer body is composed of two parts, which are axially displaceable in relation to each other through the intermediation of an elastic body.

References Cited

UNITED STATES PATENTS

| 2,426,219 | 8/1947 | Jackson | 287—53 |
| 2,755,093 | 7/1956 | Peter et al. | 287—53X |
| 3,354,845 | 11/1967 | Schultz | 287—52.06 |

FOREIGN PATENTS

| 1,095,064 | 12/1960 | Germany | 287—52.06 |

DAVID J. WILLIAMOWSKY, Primary Examiner

A. V. KUNDRAT, Assistant Examiner

U.S. Cl. X.R.

279—2